United States Patent [19]

Aron et al.

[11] 4,251,868
[45] Feb. 17, 1981

[54] TAKE-OFF DIRECTOR SYSTEM

[75] Inventors: Ioan Aron; Ion Tomescu, both of Bucharest, Romania

[73] Assignee: Compania de Transport Aerian Tarom, Bucharest, Romania

[21] Appl. No.: 942,821

[22] Filed: Sep. 15, 1978

[51] Int. Cl.³ .............................................. G06F 15/50
[52] U.S. Cl. .................................... 364/427; 73/178 T
[58] Field of Search ........................ 364/427; 73/178 T

[56] References Cited

U.S. PATENT DOCUMENTS

| | | | |
|---|---|---|---|
| 3,048,329 | 8/1962 | Berggren | 364/427 |
| 3,128,445 | 4/1964 | Hosford | 364/427 X |
| 3,213,683 | 10/1965 | Bunze | 73/178 T |
| 3,435,674 | 4/1969 | Sleight et al. | 73/178 T |
| 3,504,335 | 3/1970 | Hall et al. | 364/427 X |
| 3,865,071 | 2/1975 | Manor | 364/427 X |
| 4,122,522 | 10/1978 | Smith | 364/427 |

Primary Examiner—Jerry Smith
Attorney, Agent, or Firm—Karl F. Ross

[57] ABSTRACT

A take-off director system provides the pilot with a visual display on a flight director indicator of the aircraft acceleration required to reach $V_1$ speed within a length of runway calculated so that upon take-off abort the pilot will yet be able to stop the aircraft on the remaining runway; if the aircraft is not sufficiently accelerated (the accelerometer is fitted along the aircraft longitudinal axis) to enable it to reach $V_1$ speed on a given length of runway, the system warns the pilot to abort the take-off well before reaching of $V_1$. There is also a take-off abort warning when the pressure on the legs at $V_{cmg}$ speed is not reduced by a certain value depending on airport data and aircraft type. When the aircraft reaches $V_R$ speed, the system warns the pilot to pull the control column and indicates the pitch angle required to clear any obstacles.

1 Claim, 6 Drawing Figures

TAKE-OFF DIRECTOR SYSTEM

FIELD OF THE INVENTION

This invention relates to a system intended to calculate, control and monitor aircraft take-off.

BACKGROUND OF THE INVENTION

The methodologies used for plotting aircraft take-off made available by the aircraft manufacturers are well known. Such methodologies contain instructions and nomograms with the help of which the crew can and must calculate the essential elements of a take-off.

Such instructions and nomograms, as are contained in the aircraft flight manual, imply the performance of certain complex operations by the crew, for the purpose of calculating the take-off basic parameters which are:

stabilizer angular position
take-off runway maximum length
maximum take-off weight
obstacle clearance limit
$V_1$, $V_R$, $V_2$ speeds To calculate these parameters, the pilot uses the following elements, specific to each airport;

temperature
pressure
take-off runway slope
wind direction and speed
height of obstacles located close to or remote from the airport
take-off runway length
number of turbocompressors in operation
runway condition (wet, dry)
position of center of gravity and take-off all-up weight Even when the calculations are correctly made in accordance with the flight manual, there is still a possibility of accidents due to the following factors:

modification of temperature and pressure values between the moment the take-off elements are calculated and the moment the take-off takes place (in the case of crowded airports in unstable climatic conditions);

modification of wind speed and take-off runway condition, between the moment the take-off elements are calculated and the moment the take-off takes place;

occurance of certain failures or transient conditions at take-off leading to an increase in the value of friction coefficients, and implicitly to an increase in the time required to reach $V_1$; and payload real value much higher than that contained in the transport documents.

If two or more of the above mentioned factors making the take-off process more difficult are cumulated, a condition may occur wherein $V_1$, the decision speed at which the pilot must decide whether to continue or discontinue the take-off, is reached too late, i.e. the aircraft has traveled too far on the runway. In such cases, if everything is operating normally, the aircraft can safely take-off; but, if before reaching $V_1$ an engine fails, there is fire on board or some other special circumstances appear, the pilot is obliged to discontinue his take-off and, the aircraft, not being able to stop within the runway distance left, runs off the take-off runway.

At present, passenger and cargo aircraft, of either eastern or western production, are not provided with automatic or semi-automatic systems which can calculate and indicate to the pilot the best take-off process, from the flight safety point of view.

SUMMARY OF THE INVENTION

The take-off director system, according to the invention, eliminates the above mentioned disadvantages because it uses a special-purpose electronic computer. This computer, with the help of an algorithm based on the nomograms calculated by the aircraft manufacturer and using airport date, engine power available and aircraft weight data, determines the optimal aircraft acceleration necessary to reach the decision speed within a runway length so calculated as to allow the pilot to stop the aircraft under completely safe conditions. For a discontinued take-off the computer uses the existing flight director in the aircraft, the real acceleration value being measured by an accelerometer mounted on the aircraft parallel with its longitudinal axis, which output is compared with the optimal value calculated for the aircraft acceleration and the result is displayed on the flight director indicator of the aircraft. The system uses an algorithm which provides the comparison, in 10 fixed successive points along a distance from the beginning of take-off to the moment the decision speed is reached within the above mentioned runway length, between the true airspeed of the aircraft and the preset values corresponding to each fixed point depending on aircraft data. The visual and acoustic warning for the pilot to discontinue his take-off is given when for three of more times the aircraft true airspeed at the fixed points is lower than that calculated by the specialized electronic computer.

SPECIFIC DESCRIPTION

Figure 1:
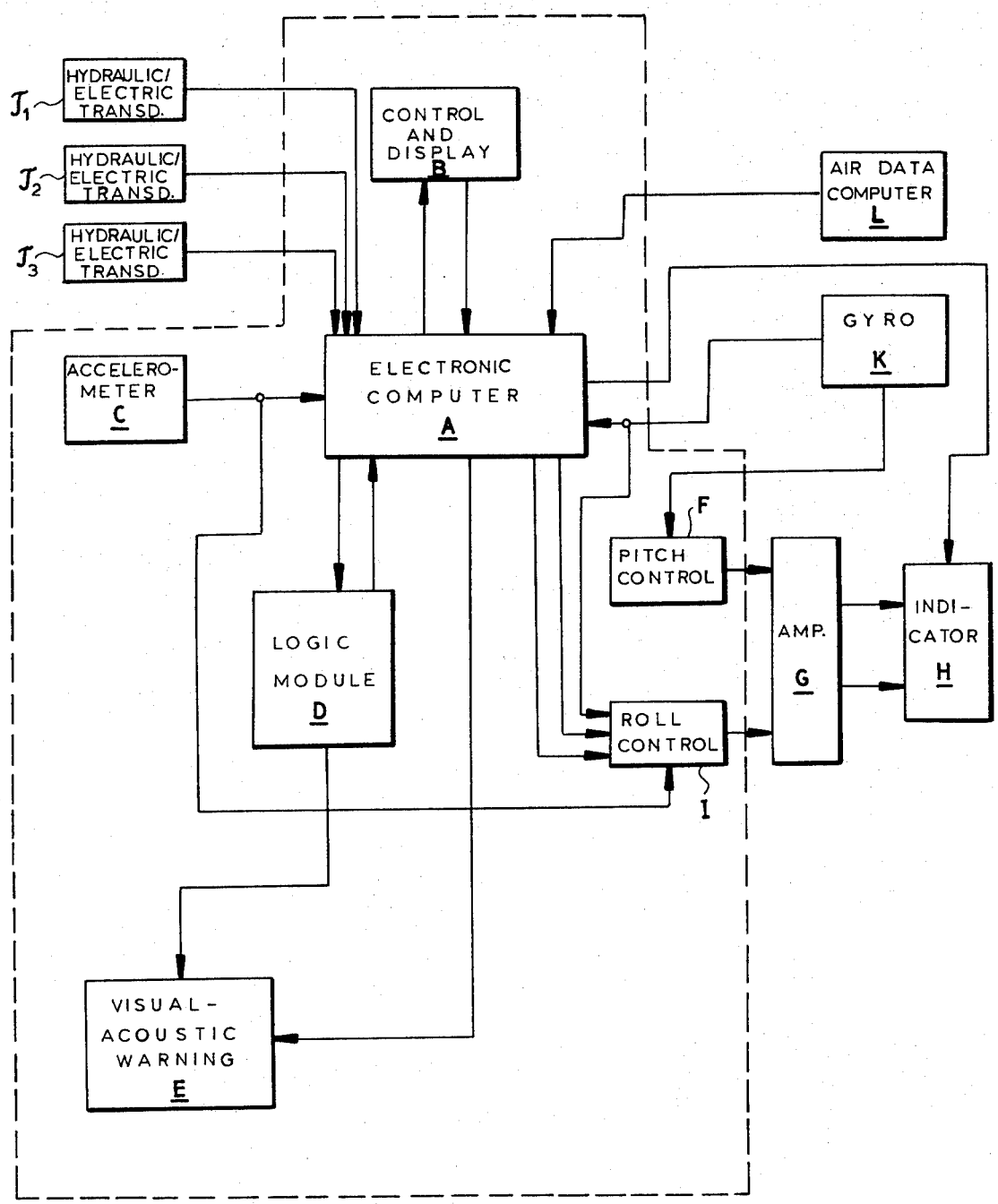
FIG. 1 is a take-off director system block diagram.

The system, according to the invention, contains a specialized electronic computer A, a control and display desk B, an accelerometer C, fitted along the aircraft horizontal plants, parallel to the aircraft longitudinal axis, a logical module D which together with a visual acoustic warning device E indicates the pilot the moment to discontinue the take-off, a module F which, through an amplifier block G, controls the pitch movement of the control bars in the flight director. Indicator H and the module I which controls the roll movement of the same bars.

The system, according to the invention, receives pressure information from the three aircraft landing gear struts through the electric hydraulic pressure transducers $J_1$, $J_2$ and $J_3$, aircraft pitch and roll angle information from the aircraft vertical gyro K, and an air data central computer L transmits to computer A information on the aircraft absolute altitude and vertical speed.

With the help of data received from the transducers $J_1$, $J_2$ and $J_3$, the central computer A computes the aircraft center of gravity position and its total weight.

Computer A also calculates the acceleration imposed on the aircraft to make it reach $V_1$ within a runway length so calculated as, in case the pilot discontinues the take-off, the aircraft could be stopped without leaving the runway.

To allow the pilot to adjust correctly the power of the engines, computer A gives to module I the calculated value of take-off acceleration, continuously correcting this value during take-off, taking into account the pitch angle of the aircraft.

The system, according to the invention, uses a missed take-off visual and acoustic warning device E which indicates to the pilot, both visually and acoustically, the moment he should discontinue the take-off and the runway length left, received directly from computer A.

The system, according to the invention, uses for the insertion into and display from the specialized digital computer, a desk of a special configuration, where a selector $S_1$ allows the pilot to insert the data specific to the airport he is going to take-off from and also to read the values, automatically calculated by the system, necessary to prepare the take-off, as well as any values which appear during the take-off itself.

In selector position 1 the pilot inserts airport local temperature and pressure, after previously having read on the display the aircraft type and program number (already inserted in the computer) automatically displayed in this selector position. After the first data insertion in the computer (temperature and pressure) the prior indications concerning the aircraft type and program number desappear and the temperature data will be displayed on the left display and the pressure data on the right display.

The aircraft type presentation on the left display and that of the program number, inserted in the digital computer on the right display, allow the pilot to check the system being programmed for the corresponding aircraft type and the program inserted is that indicated in the technical handbook.

When the selector is moved to position 9, an automatic test is carried out for checking the correct operation of the system. All the warning lights from $L_1$–$L_5$ are on and all the alphanumeric characters from $D_1$, $D_2$ ... $D_{12}$ are displayed.

In selector position 2, the take-off runway total length is inserted into the left display, and in the right display, while the take-off takes place, a value different from zero will be indicated, representing the take-off runway length left (the portion of take-off runway necessary to bring the aircraft to a stop in case it is discontinued).

In selector position 3 the wind speed value (the component parallel with the take-off runway) is inserted in the left display and the take-off runway slope in the right display.

In selector position 4, the aircraft real all-up weight is displayed on the left and, on the right, the system displays the aircraft maximum allowed all-up weight as calculated by the system for the airport existing conditions.

In selector position 5, before take-off is started, the display will show on the left the calculated values $V_1$, $V_r$, $V_2$..., successively, at intervals of 3 seconds, in the following order: $V_1$, $V_r$, $V_2$, $V_1$ ..., and on the right display the aircraft ground speed. During the take-off process, after the system is switched on, on the left, the value $V_1$ is displayed as long as the aircraft ground speed is less or equal to $V_1$, the value of $V_r$ as long as the aircraft ground speed is less or equal to $V_r$ and the value of $V_2$ as long as the aircraft ground speed is less or equal to $V_2$; the indications are automatically changed from $V_1$ to $V_r$ and then to $V_2$.

In selector position 6 the system automatically displays the aircraft center of gravity position on the left and the stabilizer corresponding angular position on the right.

In selector position 7, the pilot inserts on the left display the heights of obstacles close to the airport and on the right display he successively inserts the number of turbocompressors started, whether the runway is wet and the wing deicing system is on.

In selector position 8 the system displays on the left the engine pressure ratio necessary to take-off and on the right the pilot inserts a runway specific value as recommended by the constructor (clearway).

On the control and display desk front panel there are red, green and orange warning lights indicating reaching certain engine powers or the necessity of pilot intervention, in the case of critical flight.

When $V_r$ is reached, the orange light $L_4$ "PULL UP" goes on blinking, the pilot being also acoustically warned, in the headset, to pull the stick (PULL UP, PULL UP etc).

When take-off is to be discontinued, the pilot also receives a visual and acoustic indication (the red light $L_5$ "ABORT TAKE-OFF" goes on and the "ABORT TAKE-OFF" signal is heard in the headset).

If, as a result of automatic calculations, it is concluded that no limits are exceeded, the take-off is permitted and the green light $L_2$ "TAKE-OFF PERMITTED" goes on; if the limits are exceeded, the red light $L_3$ "TAKE-OFF PROHIBITED" goes on.

Before take-off, the system is switched on and the green light $L_1$ "SYSTEM ON" goes on indicating the system has been connected to monitor the take-off process.

Figure 2:
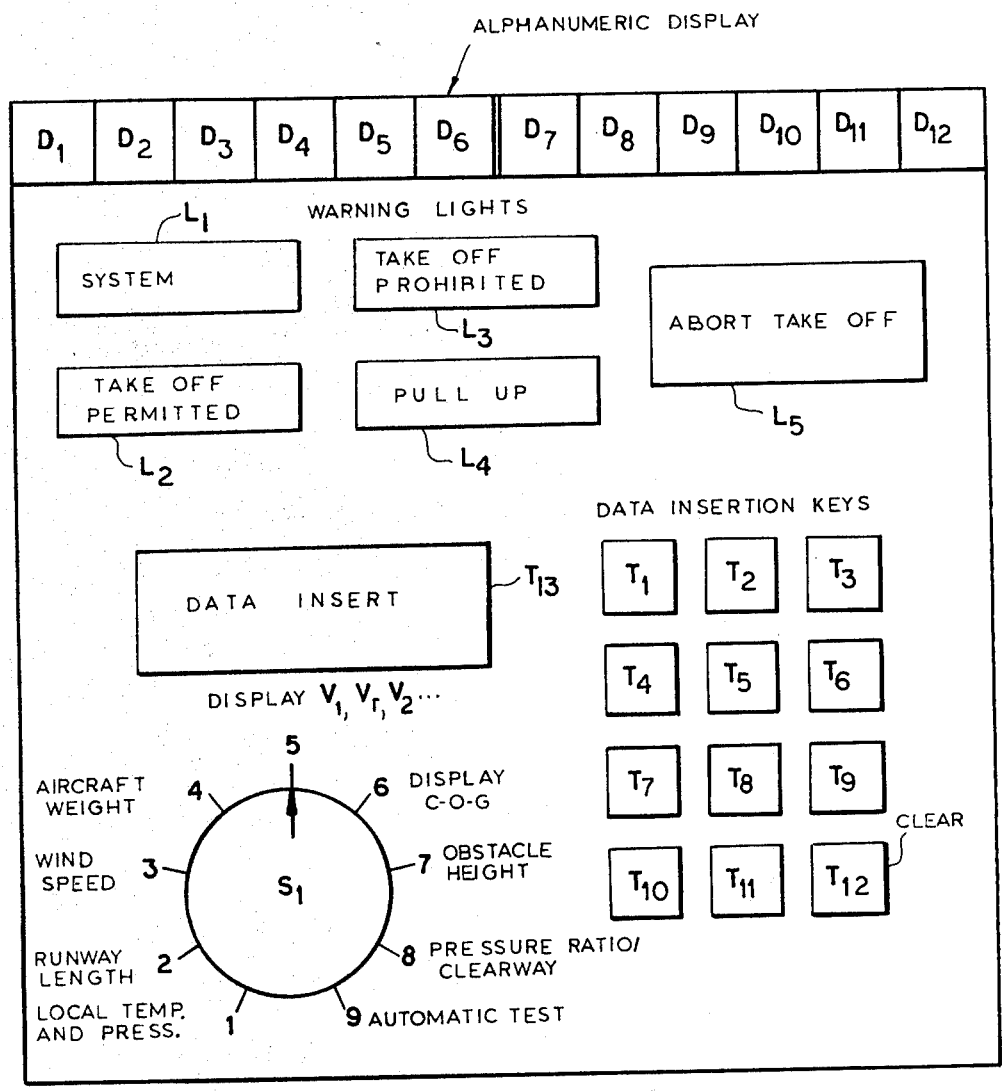
FIG. 2 is a diagram of the control and display desk external configuration.
Figure 3:
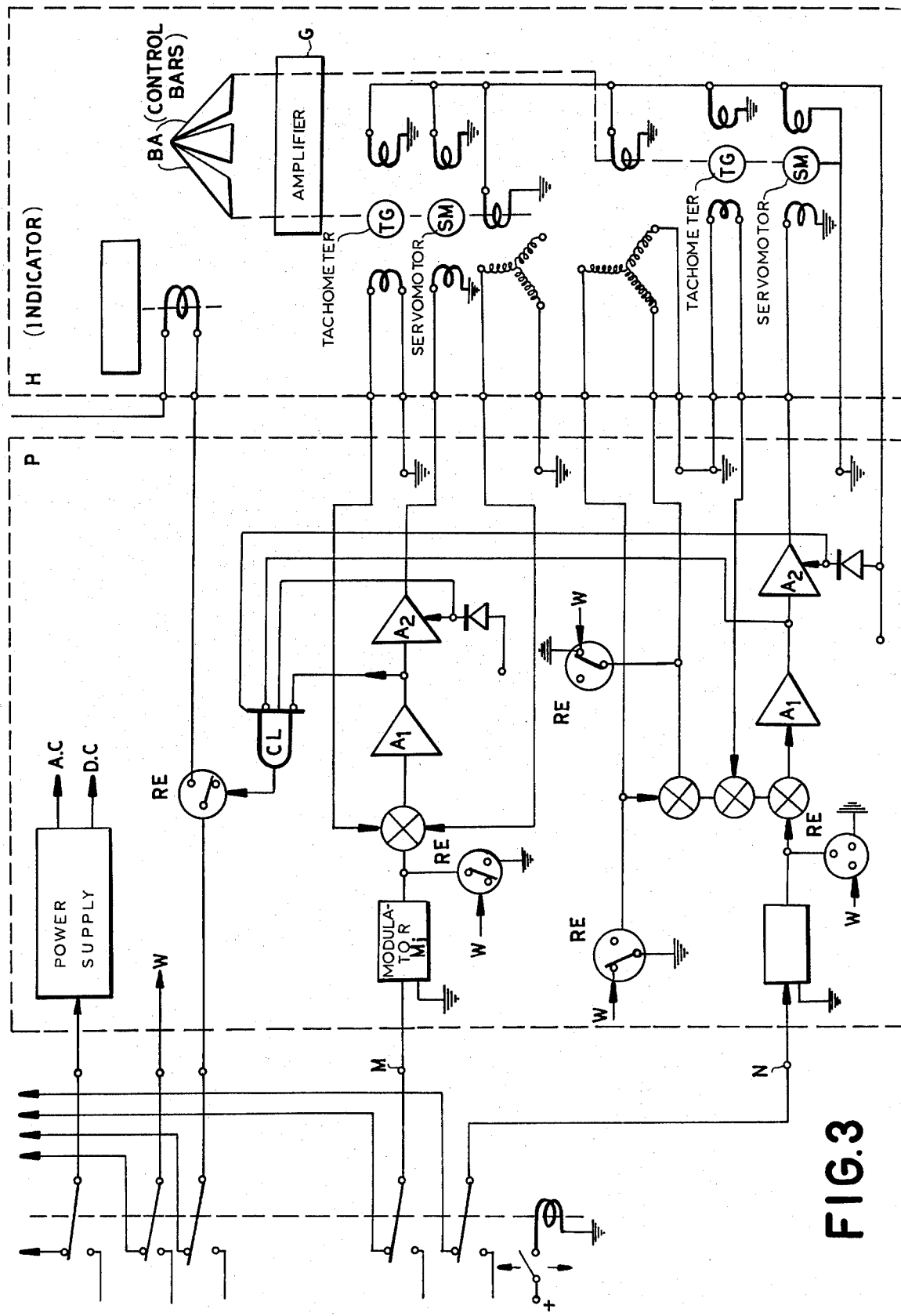
FIG. 3 is a flight director indicator control electric circuit diagram.
Figure 4:
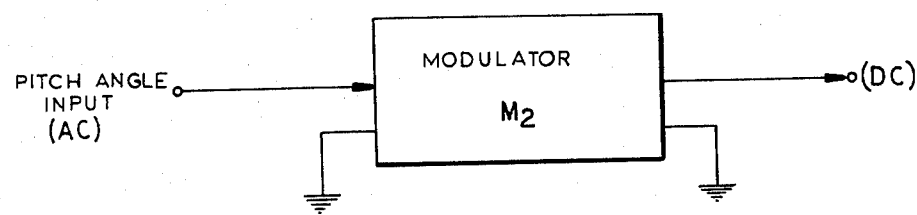
FIGS. 4 and 5 are flight director indicator control pitch and roll control module block diagrams.
Figure 5:
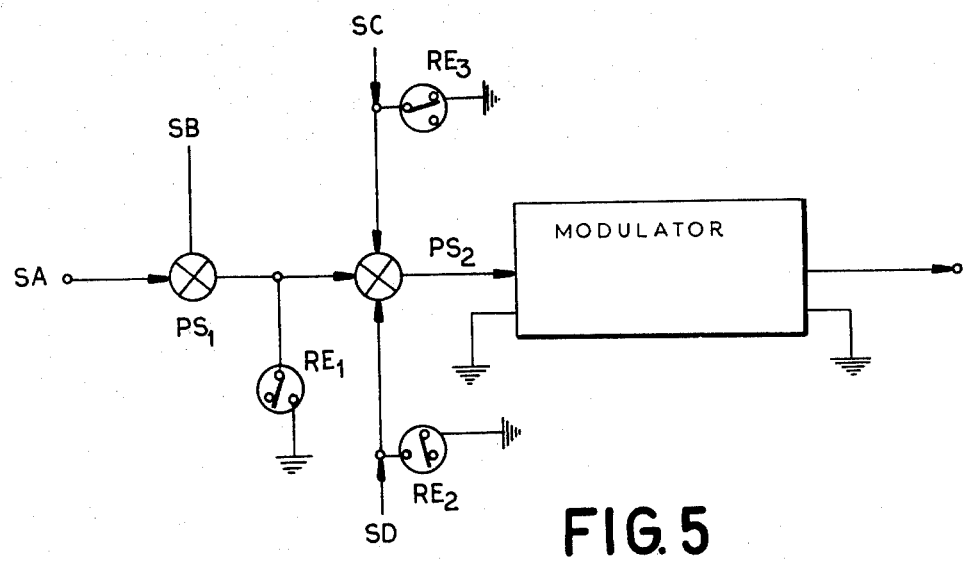
Figure 6:
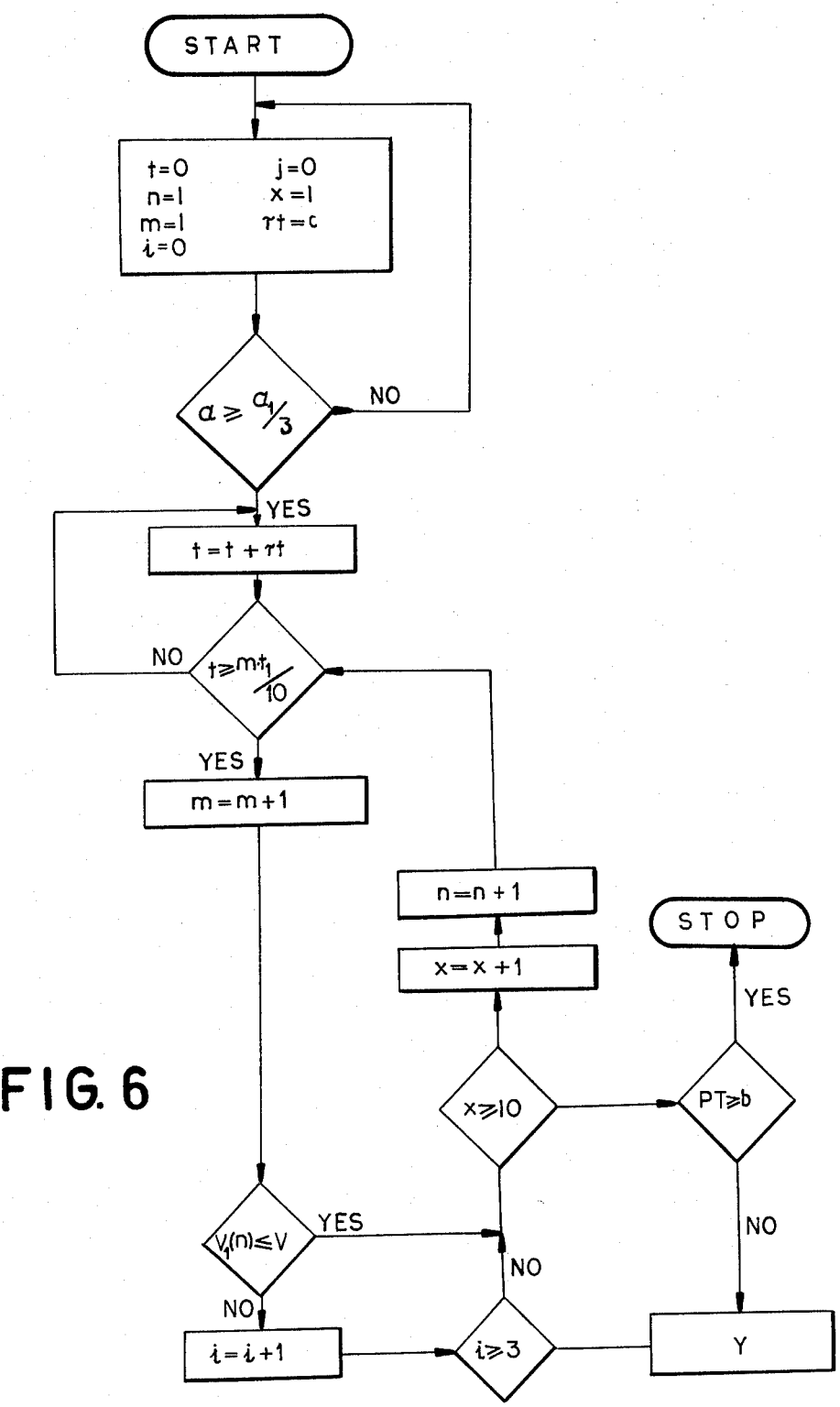
FIG. 6 is a logic diagram of the discontinued-take-off monitoring module.

To insert data in computer A, the pilot makes use of the keys $T_1$, $T_2$–$T_{13}$; the keys $T_1$–$T_{10}$ contain the figures 1,2,3,4,5,6,7,8,9,0, the key $T_{11}$ containing the decimal sign; the key $T_{12}$ (CLEAR) provides the cancellation of data in the event of a mistake and the key $T_{13}$ (INSERT) provides the insertion of data from the display buffer store into the computer memory.

Besides their numeric meaning, the keys $T_2$, $T_4$, $T_5$, $T_6$ and $T_8$ have also a sign meaning. For example, when inserting the runway slope only, the key $T_2$ indicates a positive value and $T_8$ a negative one and the additional indication will be UP on key $T_2$ and DN on $T_8$.

With the keys $T_4$ and $T_6$, when inserting the wind speed only, the system can indicate whether it is a headwind or a tailwind. For a headwind an H is indicated on $T_4$ (H) and for a tailwind a T is indicated on $T_6$ (T).

To insert negative data, the first function of the key $T_5$ is to indicate minus (—).

If, for example, the $S_1$ selector is set in position 3, the pilot must insert into the left display ($D_1$–$D_6$) the wind speed value and in the right display ($D_7$–$D_{12}$) the runway slope value (for example a 25 knots tailwind and a positive slope of 1.5 degrees). In this case, the pilot selects position 3 on $S_1$ and presses key $T_6$. The left display goes off, the letter T appears in $D_1$ and key $T_{13}$ goes on indicating the pilot he can start inserting the data. The keys $T_2$, $T_5$ are pressed and then key $T_{13}$ which inserts this numerical value into the computer, $T_{25}$ appears on the left display, the lights $D_4$, $D_5$ and $D_6$ being off.

To insert runway slope, key $T_2$ is pressed when key $T_{13}$ comes on and on the right display the letters UP appear in $D_7$ and $D_8$; keys $T_1$, $T_{11}$ and $T_5$ are further pressed, in order. If the correct values are shown, key $T_{13}$ is pressed again to insert the key which goes off when the value is inserted into the computer. To clear possible mistakes made while pressing the keys, key $T_{12}$ "CLEAR" is pressed and the system goes back to its initial position before the insertion of the last value.

To indicate to the pilot the optimal engine power, the take-off director system uses the same flight director indicator existing in the aircraft, for example the FD-108 type.

The DC input at M and N in the amplifier block (FIG. 3), according to the invention, comes from the take-off director system and controls the pitch and roll movement of the control bars (indicated with the letters BA) through the amplifier block G.

Two AC tacho-generators TG used to damp the sudden movements and oscillations in the mechanical part of the attitude indicator, together with 2 induction two-phase servomotors SM, 2 servo-amplifiers $A_1$, $A_2$, several electronic relays RE, a logic circuit CL and 2 modulators $M_1$ form the flight amplifier-indicator block existing in modern transport aircraft. When the system is stopped, the logical condition W has the value "1" and controls the tilting of the electronic circuits shown in FIG. 3.

If the DC input in the amplifier block G is null, both for pitch and roll, the bars BA are perfectly placed on the miniature aircraft MA; this position is considered as being the best in the take-off process. If the control signal becomes positive or negative, the bars BA will move from the central position proportionally with the control signal magnitude and polarity.

The flight director indicator control bars roll control module block diagram contains only one modulator $M_2$ (FIG. 4) which converts the AC input, which is directly proportional to the aircraft pitch angle, into a DC signal and applies it to the control amplifier terminal in the flight director indicator.

The flight director indicator control bars pitch control module block diagram (FIG. 5) contains a modulator $M_3$, two points of summation $PS_1$ and $PS_2$ and 3 electronic relays $RE_1$, $RE_2$ and $RE_3$. The input signal SA is directly proportional to the real values of the aircraft longitudinal accelerations, with gravity adjustments. Another signal SB is calculated by the specialized digital computer, to which the adjustments for aircraft pitch angle are applied so that the aircraft reaches $V_1$ within the calculated space. A third signal SC is calculated in the digital computer and through SD the aircraft true pitch angle is shown.

The flight director indicator pitch indication operates in two distinct conditions: before reaching Vr speed when only the aircraft acceleration is taken into account, and after reaching Vr speed when only the aircraft pitch angle value is taken into consideration. The electronic computer achieves the 2 above mentioned conditions through the relays $RE_1$, $RE_2$ and $RE_3$.

The pilot will act on the engine thrust immediately after the brakes are released, from the beginning of the take-off runway, until the bars BA are perfectly superimposed on the miniature aircraft MA. This means that the aircraft true acceleration is equal to that calculated and imposed by the digital computer. Any difference between SA and SB signals is shown by a positive deviation when $SA < SB$ or negative when $SA > SB$.

To monitor the take-off process itself, the system contains an electronic module which it uses to monitor the take-off and decide to discontinue it.

According to the invention, the functional logic diagram of the take-off monitoring module D is started at the same time with the take-off director system switching on, when the aircraft is ready to take-off at the take-off runway end.

When the aircraft acceleration exceeds one third of the calculated acceleration, the take-off monitoring module D starts to operate.

To have a correct reference available for comparing the actual take-off process to, it was considered that if during the whole take-off the pilot maintains the bars on the miniature aircraft, before reaching the Vr speed, the aircraft movement can be described with the help of the law of uniform accelerating movement.

Thus, knowing the values of $V_1$ (the decision speed, whether to continue or discontinue the take-off) and SP (the difference between the total take-off runway length and the minimum space necessary to stop the aircraft when the take-off is to be discontinued) the imposed acceleration and time values were calculated as follows:

$$a_1 = V_1^2/2\ SP;\ t_1 = 2\ SP/V_1 \qquad \text{(see FIG. 6)}.$$

In these relations, the acceleration $a_1$ is calculated as being the acceleration necessary for the aircraft to reach the $V_1$ speed within the space SP, and the time $t_1$ is calculated as being the time necessary for the aircraft to reach $V_1$ after going through the space SP. To monitor the whole take-off process, 10 intermediate values of the $V_1$ speed were calculated for 10 intermediate time values $t_1/10$, $2t_1/10$, $3t_1/10$ ... $10t_1/10$, indicated with $V_1(n)$, so that the calculation logical diagram of the take-off monitoring module D allows the pilot to discontinue his take-off even before reaching $V_1$, when the aircraft has decreasing acceleration or when the acceleration is constant but less than the imposed one.

The take-off monitoring module D also indicates the necessity to discontinue the take-off if, when reaching a $V_1$ (10) equal to or greater than that imposed, the aircraft lift did not increase with a value "b" specific to the aircraft type concerned. In the logical diagram of module D the working constants were noted with n, m, i and j, the real time with t, a real time submultiple of the $t_1/10$ value with at, and with x the number of checks carried out between the beginning of take-off and the moment of reaching $V_1$.

In the logical diagram the aircraft true acceleration was indicated by an "a", the aircraft true airspeed V=adt and the lift increase with PT. If, during the take-off, logical conditions appear requesting to discontinue the take-off, a block y will operate the respective visual-acoustic warnings.

The take-off director system, according to the invention, offers the following advantages:

it allows the pilot, at any time during the take-off, to know the aircraft ground speed and the length of the take-off runway covered;

it indicates the pilot the optimal engine thrust for each take-off setting;

it automatically calculates all the take-off parameters eliminating any human error;

it warns the pilot on the moment to start to discontinue the take-off thus eliminating the danger of the aircraft getting off the runway;

it indicates the pilot the optimal pitch angle to clear the obstacles;

it is designed to operate on any type of aircraft, its adaptation consisting in the insertion of the program specific to each type of aircraft.

We claim:

1. A take-off director system for an aircraft, comprising:

- a flight director indicator on said aircraft adapted to form a display representing pitch angle and an orientation of the aircraft relative to the pitch angle;
- an accelerometer mounted along the longitudinal axis of the aircraft providing a signal representing the acceleration of said aircraft;
- a plurality of hydraulic-pressure/electrical transducers mounted on respective landing-gear struts of the aircraft for producing signals representing the load on said struts;
- means for registering data constituting parameters of operation of the aircraft and including available engine power, aircraft weight and airport data including runway length, obstacle height and ambient temperature and pressure conditions for producing a signal representing the aircraft optimal acceleration necessary to reach a decision speed $V_1$ within a runway length sufficient to allow a pilot of the aircraft to stop the same within a remaining length of runway;
- means for comparing the output of said accelerometers with said signal representing said optimal acceleration, for displaying same on said flight director indicator, said registering means establishing a value of a time from inception of take-off to $V_1$ at the optimal acceleration;
- means for monitoring the actual speed of said aircraft and comparing the same at a plurality of sequential instants with calculated airspeed values over the interval represented by said time and determining the number of instances at which the comparison shows the actual speed of the aircraft to be less than the calculated values;
- means responsive to said monitoring means for providing a visual and an acoustic signal instructing the pilot to abort the take-off upon detection of at least three such instances;
- means for triggering said visual and acoustic signal upon the absence of a decrease in load as represented by the signals produced by said transducers by comparison with predetermined values of attainment of such decision speed $V_1$;
- a display and input device connected with the means for registering data, said device displaying said decision speed $V_1$, a lift-off speed $V_r$ and a further speed $V_2$ representing a condition for take-off; and
- means for sequentially displaying $V_1$, $V_r$ and $V_2$ during the start of take-off and thereafter discontinuing the display of them as the respective speeds are reached.

* * * * *